(12) United States Patent
Hobbs

(10) Patent No.: US 8,460,419 B1
(45) Date of Patent: Jun. 11, 2013

(54) AIRPLANE LAVATORY FILTERING SYSTEM DEVICE

(76) Inventor: Cliff Hobbs, St. Petersburg, FL (US)

( * ) Notice: Subject to any disclaimer, the term of this patent is extended or adjusted under 35 U.S.C. 154(b) by 0 days.

(21) Appl. No.: 13/421,338

(22) Filed: Mar. 15, 2012

(51) Int. Cl.
*B01D 46/00* (2006.01)

(52) U.S. Cl.
USPC ............ 55/385.2; 55/DIG. 35; 454/195; 454/245; 454/309

(58) Field of Classification Search
USPC ............ 55/385.2, 471, 481, 385.1, 482, 496, 55/506, DIG. 31, DIG. 18; 454/187, 195, 454/181, 238, 239, 259, 309; 40/484, 606.07, 40/611.05, 611.06
See application file for complete search history.

(56) References Cited

U.S. PATENT DOCUMENTS

| | | | | |
|---|---|---|---|---|
| 4,048,756 | A | | 9/1977 | Lawrence |
| 4,809,454 | A | * | 3/1989 | Weisman .................... 40/606.07 |
| 5,176,570 | A | * | 1/1993 | Liedl ............................ 454/309 |
| 5,660,605 | A | * | 8/1997 | Chan et al. .......................... 96/19 |
| 6,336,293 | B1 | | 1/2002 | Kamimura |
| 6,454,209 | B1 | | 9/2002 | Bock et al. |
| 6,533,835 | B2 | * | 3/2003 | Wilson et al. .................... 55/481 |
| 6,702,230 | B2 | | 3/2004 | Movsesian et al. |
| 7,654,487 | B2 | | 2/2010 | Ghoreishi |
| 8,246,703 | B2 | * | 8/2012 | Bordin .......................... 55/385.2 |
| 2006/0169840 | A1 | | 8/2006 | French et al. |
| 2007/0158499 | A1 | | 7/2007 | Whittingham |
| 2008/0099606 | A1 | | 5/2008 | Horstman et al. |

\* cited by examiner

*Primary Examiner* — Duane Smith
*Assistant Examiner* — Minh-Chau Pham
(74) *Attorney, Agent, or Firm* — Thomas Frost

(57) ABSTRACT

The present invention an airplane air filtering system device comprised of a frame having flanges, including means to mount to the inside surface of a lavatory door oriented with vent louvers. The frame is preferably mounted to the door with adhesive strips. A replaceable filter with a grasping tab is placed within the frame. As the toilet in the airplane lavatory is flushed, vacuum action causes air outside of the lavatory to be pulled through the filter.

4 Claims, 3 Drawing Sheets

AIRPLANE LAVATORY FILTERING SYSTEM DEVICE

BACKGROUND OF INVENTION

The present invention relates to an airplane air filtering system device comprised of a frame for a replaceable filter mounted to the inside surface of a lavatory door behind louvers.

While air filtering devices for commercial air travel are available the air filters are inefficient. The present invention is comprised of a housing for a replaceable filter mounted to the inside surface of an airplane lavatory door behind a vented louver. The housing is mounted with adhesive strips. As the toilet in the airplane lavatory is flushed vacuum action causes air outside of the lavatory to be pulled through the filter. A grasping tab allows the filter to be easily replaced. Fragrance in the filter refreshes the inside area of the lavatory.

SUMMARY OF THE INVENTION

The general purpose of the present invention, which will be described subsequently in greater detail, is to provide a new and improved air filtering system for lavatories of airplanes, trains or other modes of commercial travel.

To attain this, the present invention comprises a frame having a front wall with passages therethrough, side walls, a bottom wall, and flanges having an upper surface and lower surface depending outwardly from the bottom wall and side walls. The frame has an inner surface defining a chamber and there is an opening defined by an upper end of the side walls. Mesh panels are mounted and aligned with the passages of the front wall.

The frame is mounted to the inside surface of a lavatory door covering a vent louver. The frame is secured to the door by adhesive strips attached to the lower surface of the flanges. A filter dimensioned to fit within the chamber of the frame is provided. The filter has a grasping tab at a top edge to allow easy removal from the frame.

It is an object of the present invention to provide a frame for holding a filter which is easily replaced if damaged.

It is also an object of the present invention to provide means to continually refresh air each time the toilet is flushed in a vacuum flush system present in the lavatories of many airplanes, ships, trains or other vehicles.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

Figure 1:
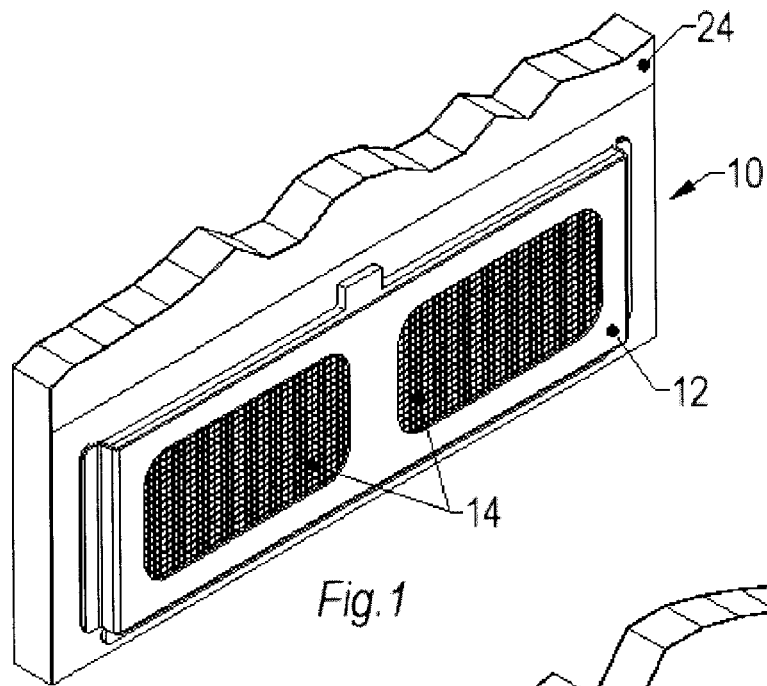
FIG. 1 is a perspective view of the present invention mounted to an airplane lavatory door.
Figure 2:
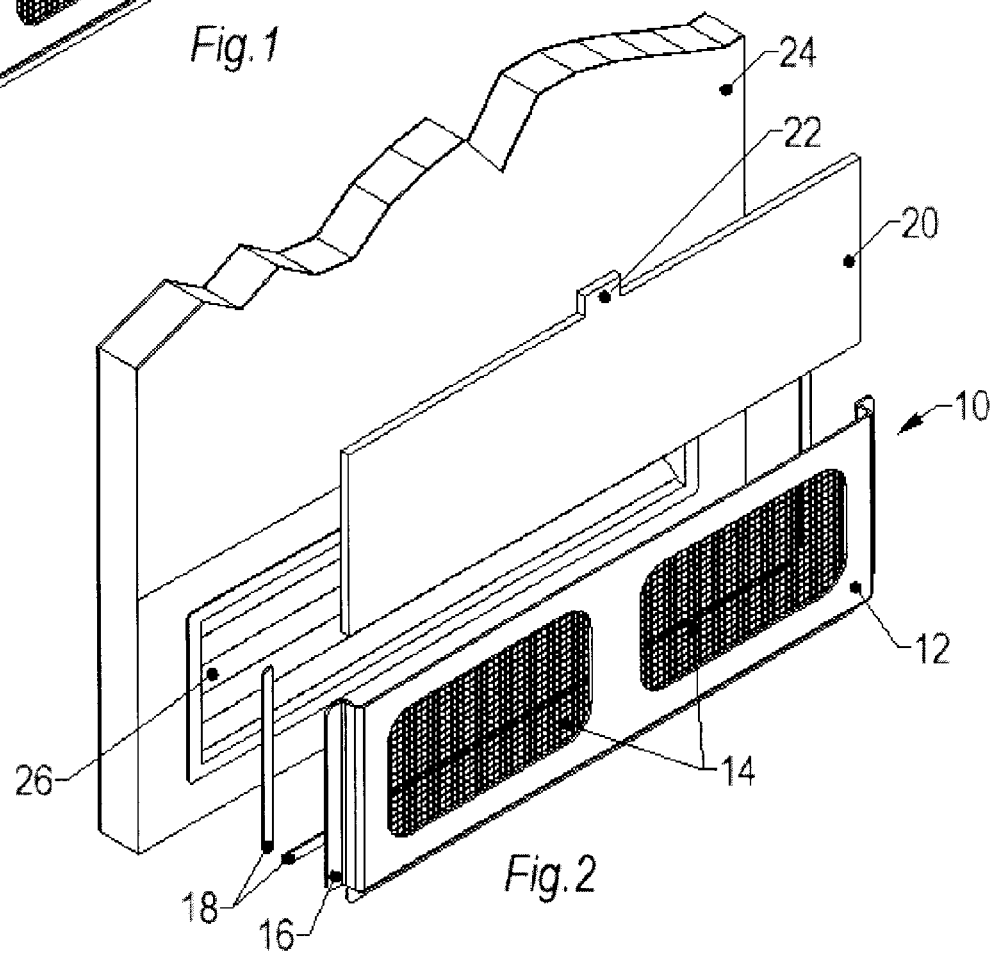
FIG. 2 is an exploded view of the present invention.
Figure 3:
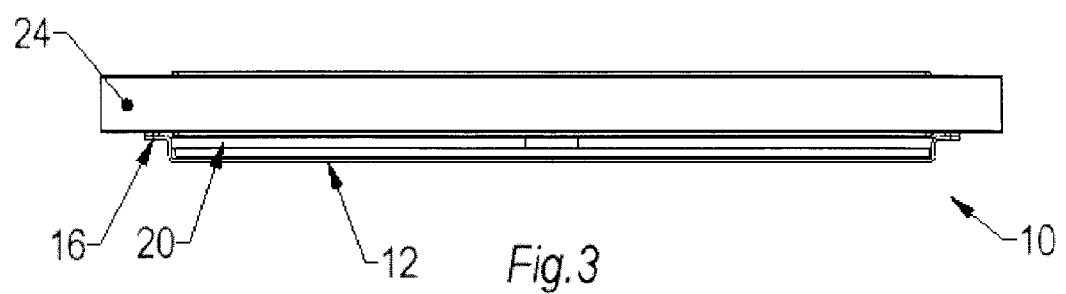
FIG. 3 is a top plan view of the invention.
Figure 4:
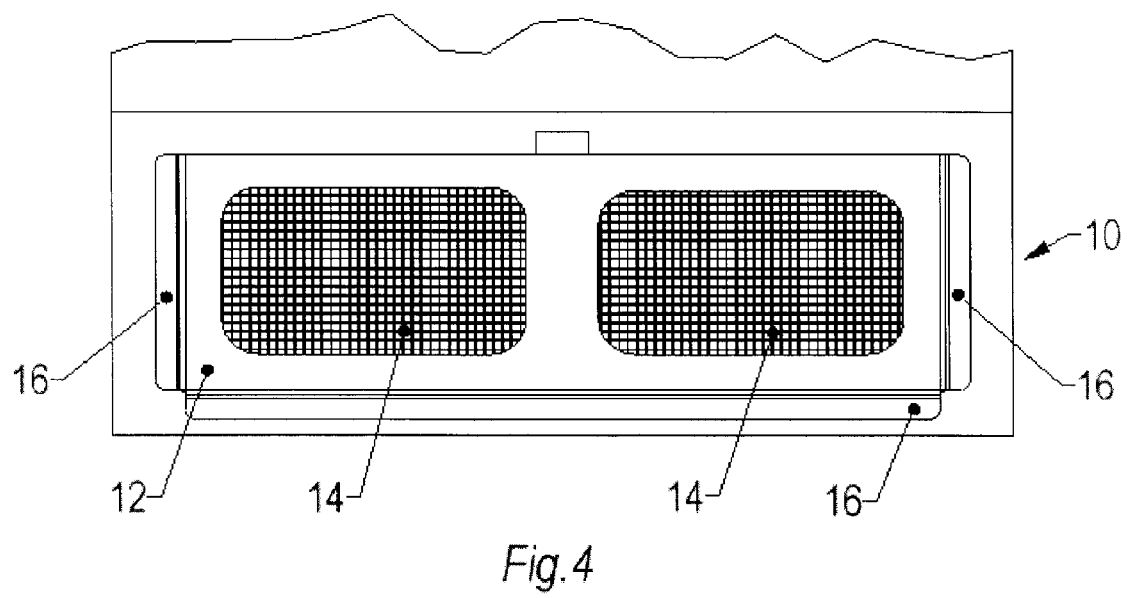
FIG. 4 is a front view of the invention.
Figure 5:
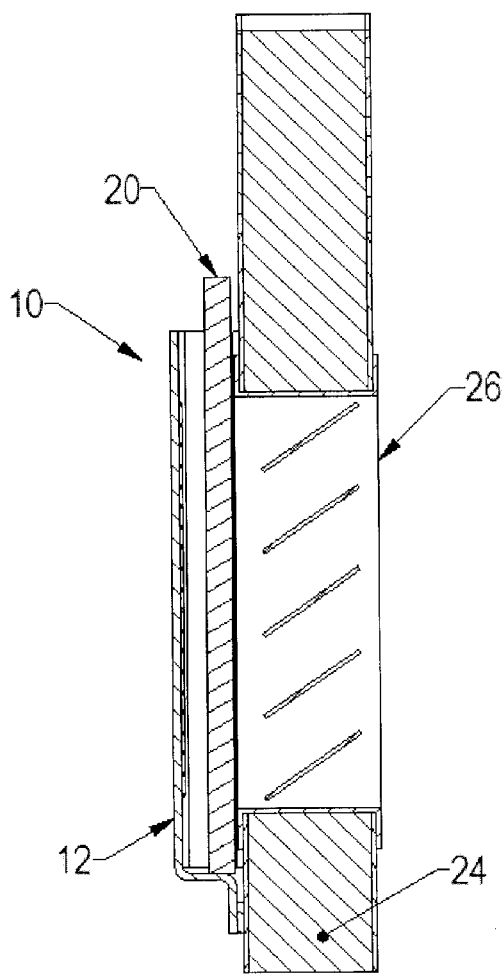
FIG. 5 is a side cross-sectional view of the invention.
Figure 6:
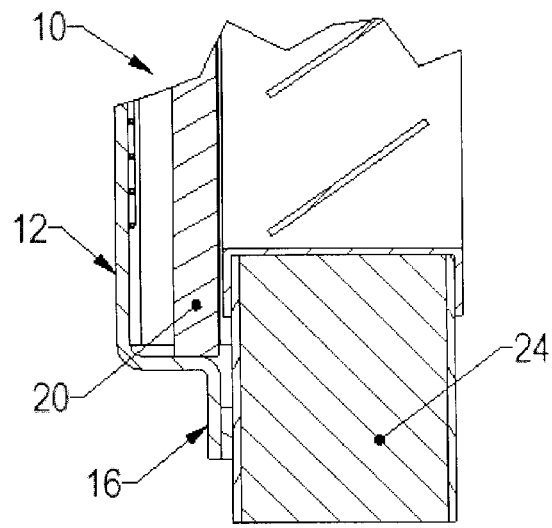
FIG. 6 is a fragmentary side cross-sectional view of the invention.

In reference to FIGS. 1 and 2, the invention, denoted generally by reference numeral 10, is shown mounted to a lavatory door 24 of an airplane. The device 10 comprises a frame 12 having a pair of transverse side walls, each with a first end and a second end, with inner and outer surfaces, and each defining the width of the frame 12, a longitudinal bottom wall integrally formed perpendicularly with the first ends of the side walls, with an inner and outer surface, defining the length of the frame 12, and a front wall with passages defined therethrough. Flanges 16, having an upper surface and a lower surface, depend outwardly perpendicularly from the side walls and bottom wall. The frame 12 and flanges 16 are formed of resilient material, preferably aluminum or impact resistant plastic. The inner surfaces of the walls define a chamber and there is an opening defined at the second end of the side walls of the frame 12.

Panels 14 formed of mesh material, with air pathways therethrough, are mounted on the inner surface of the frame 12 and aligned with the passages of the front wall of the frame 12.

As illustrated in FIG. 2, the frame 12 is mounted to the inside surface of the door 24 covering a vent louver 26. The louver has a ventilation structure and provides a plurality of air passages to the lavatory unit of an airplane (not shown). The frame 12 is mounted to the door 24 by adhesive strips 18 attached to the bottom surface of the flanges 16, although other means of mounting such as with rivets positioned through the flanges 16 are possible. A filter 20 of a generally rectangular shape dimensioned to fit within the chamber of the frame 12 is provided. The filter 20 has a grasping tab 22 at the top edge to allow easy removal from the frame 12. The filter 20 is preferably formed of biodegradable course foam which has been treated with a fragrance approved by the FAA (Federal Aviation Administration) or NTSB (National Transportation Safety Board).

Since the frame 12 is adhesively attached, the frame 12 can be easily removed if damaged. In the illustrated embodiment, a pair of panels 14 is present. In some applications it should be recognized that a single panel 14 of mesh material is preferable, for instance when there is a pair of airplane doors with vent louvers of smaller dimension, and separate devices 10 need to be mounted.

Many airplanes, ships, trains or vehicles have a lavatory that has a vacuum flush system. In use, an occupant of the lavatory flushes the toilet causing air outside of the lavatory to be pulled through the filter 20. The air in the lavatory is continuously freshened because each time the toilet is flushed air flows through the filter 20 and provides fragrance to the lavatory. Additionally, the filter 20 refreshes the air in the general cabin area while the bathroom is unoccupied, and not in use.

With respect to the above description then, it is to be realized that the optimum dimensional relationships for the parts of the invention, to include variations in size, materials, shape, form, function, and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An airplane air filtering system device mounted to the inside surface of a lavatory door covering a vent louver, comprising in combination:

a frame having side walls, a bottom wall, a front wall with passages defined at a predetermined location therethrough, and further having a chamber defined by inner surfaces of the walls and an opening defined at a top of the frame;

flanges, having an upper surface and a lower surface, depending outwardly perpendicularly from the side walls and the bottom wall;

a panel of mesh material mounted on the inner surface of the frame and aligned with the passages of the front wall of the frame;

means to mount the flanges to the lavatory door; and a filter dimensioned to fit within the chamber of the frame.

2. The device of claim 1, further comprising a grasping tab integrally formed on a top edge of the filter.

3. The device of claim 2, whereby the means to mount the flanges to the lavatory door are adhesive strips attached to the bottom surface of the flanges.

4. An airplane air filtering system device mounted to the inside surface of a lavatory door covering a vent louver, comprising in combination:

a frame having side walls, a bottom wall, a front wall with a pair of passages defined at a predetermined location therethrough, and further having a chamber defined by inner surfaces of the walls and an opening defined at a top of the frame;

flanges, having an upper surface and a lower surface, depending outwardly perpendicularly from the side walls and the bottom wall;

a pair of panels of mesh material mounted on the inner surface of the frame and aligned with the passages of the front wall of the frame;

means to mount the flanges to the lavatory door; and a filter dimensioned to fit within the chamber of the frame.

* * * * *